(No Model.)  2 Sheets—Sheet 2.
M. R. PRYOR.
MECHANICAL DIGGER.
No. 357,536. Patented Feb. 8, 1887.
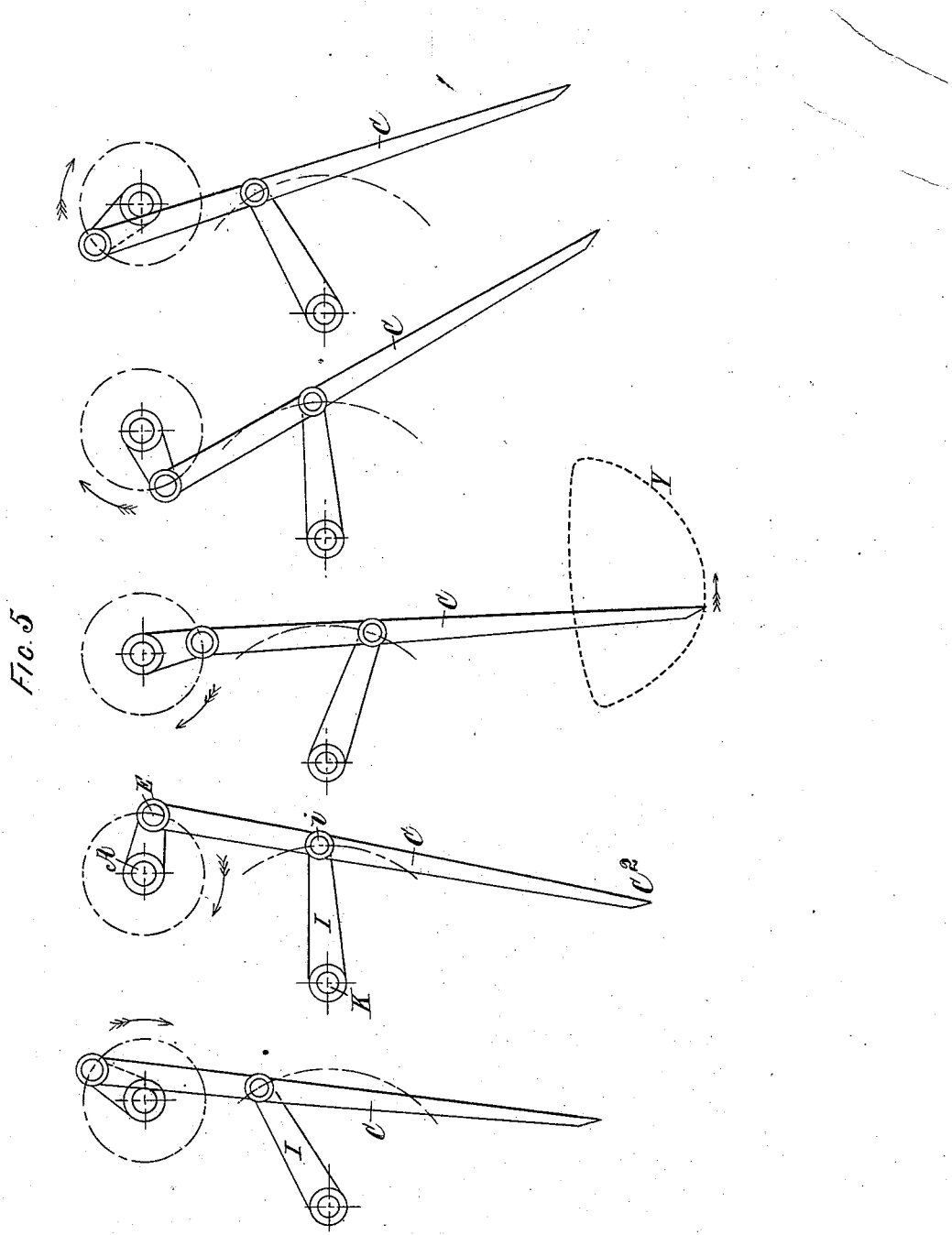

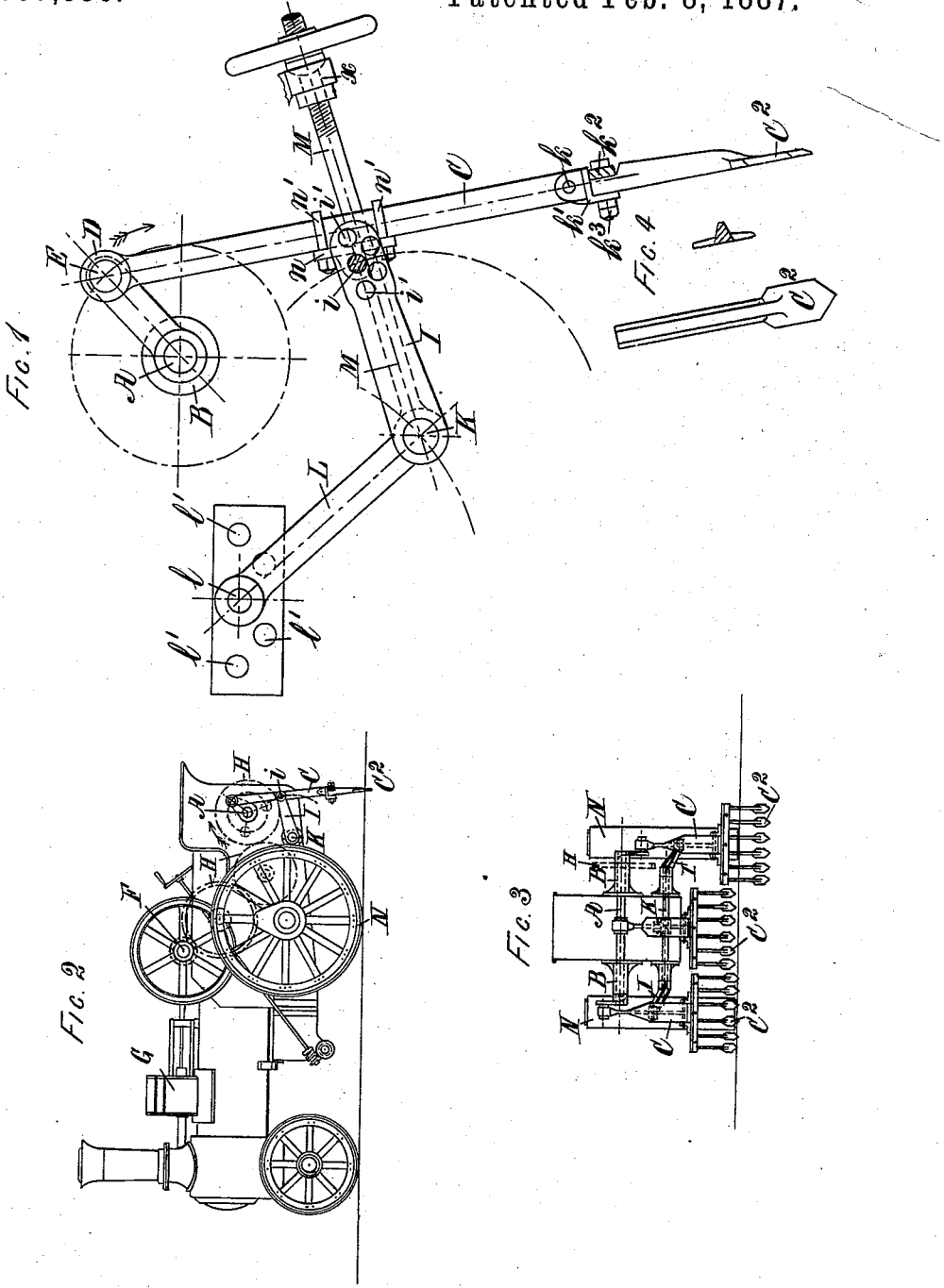

UNITED STATES PATENT OFFICE.

MARLBOROUGH ROBERT PRYOR, OF STEVENAGE, COUNTY OF HERTS, ENGLAND, ASSIGNOR TO FRANK PROCTOR, OF SAME PLACE.

MECHANICAL DIGGER.

SPECIFICATION forming part of Letters Patent No. 357,536, dated February 8, 1887.

Application filed November 1, 1886. Serial No. 217,687. (No model.) Patented in England April 4, 1884, No. 5,956.

*To all whom it may concern:*

Be it known that I, MARLBOROUGH ROBERT PRYOR, a subject of the Queen of Great Britain, residing at Stevenage, in the county of Herts, England, gentleman, have invented certain new and useful Improvements in Mechanical Diggers, (for which I have received Letters Patent in England, No. 5,956, dated April 4, 1884;) and I do hereby declare the following to be a full, clear, and exact description of the invention, reference being had to the accompanying drawings, which form part of this specification.

My invention relates to that form of mechanical digger for cultivating land in which the digging is accomplished by sets of forks or tines set in motion by a crank-shaft driven by a steam or other engine.

The object of my invention is to produce a mechanical digger in which the motion of the forks or tines is especially adapted for quickly and effectually turning over and cultivating the ground. The crank-shaft by which they are driven is situated where it is free from dirt and injury, and the machine can be readily adjusted to suit different kinds of digging work.

The essential feature of my invention consists in the means and mechanism employed to actuate and adjust the digging forks or tines.

In the accompanying drawings, Figure 1 represents a side elevation of the digging-forks, showing arrangement of the crank-shaft by which they are driven, and the arms and screw by which their position can be adjusted for different kinds of digging work. Fig. 2 is a side view, on a small scale, of a traction steam-engine having my improved digger fitted to it. Fig. 3 is a back view of the same. Fig. 4 represents different views of the movable digging-tine which I prefer to use. Fig. 5 represents the different positions which the forks or tines take when digging, and also shows the path through which the point of the fork or tine moves.

Similar parts referred to are marked by similar letters throughout the several views.

A is the crank-shaft, which is carried in bearings B, fixed to the upper part of the frame of the machine, the upper ends of the fork handles or rods C being connected by eyes D to the crank-pins E. The shaft A is driven from the crank-shaft F of the steam-engine G by gearing H. (Indicated in dotted lines in Fig. 2.) The digging-forks $C^2$ are compelled to enter the soil at the required angle and to act upon it in the way required by means of controlling-links I, pivoted at one end to the fork-handles C by the pin $i$. This pin $i$ is mounted in the lug $n$, which is adjustable upon the fork handle or rod C, to which it is fixed by clamps and bolts $n'$, and the pin $i$ may be placed in either of the holes $i'$, so as to alter the effective length of the links I. The links I are pivoted at their other ends to the transverse bar K, which is carried by a frame composed of the links L, Fig. 1, and one or more screwed rods, M, in such a manner that the position of the rod K remains fixed in relation to the frame of the machine while the machine is at work, but is capable of adjustment (by the screwed bar M) so as to vary the character of the stroke or digging action of the forks $C^2$. The links L are pivoted to the frame of the machine by pins $l$, which may be placed in either of the holes $l'$, and the screwed rod or rods M pass through a fixed bracket, $x$, which carries a nut or wheel by which the position of the rod M and the bar K is adjusted.

The shaft A preferably carries three cranks, each of which drives a fork handle or rod, C, and a set of forks or tines, $C^2$, as shown in Fig. 3, the cranks being arranged at equal distances apart, so that the forks come into operation in succession. The steam-engine G also drives gearing which actuates the main or carrying wheels N, so as to propel the machine forward at the requisite speed.

Where the digging to be done is of a sufficiently uniform character, the links L and screw or screws M may be omitted, the center K upon which the links I turn being fixed, and the outer ends of the links I being pivoted directly to the fork handle or rod C, as shown in Figs. 2, 3, and 5.

I prefer to make the forks or tines $C^2$ in the shape shown in Fig. 4, with a broad flat point, which enters the ground. The forks or tines $C^2$ are fixed to a cross-frame, $k'$, which turns upon a hinge or joint, $k$, Fig. 1, so that the forks can be turned up out of the way when the machine is not in operation. The upper ends of the forks or tines C² are held between the frame k' and the bar k² by means of bolts k³.

The operation of the digger is as follows: The engine G, being set in motion, causes the machine to travel slowly forward by means of the gearing driving the carrying-wheels N. At the same time the crank-shaft is also driven by the gearing H in the direction shown by the arrows. The crank-pins E cause the upper ends of the fork-rods C to move in a circle, while a point near the center of their length is constrained to move in a segment of a circle round the center K, the consequence being that the forks or tines C², at their lower end, are compelled to follow a path such as that shown at Y, Fig. 5, which is that which produces the most effective result in digging, the forks entering nearly vertically and rapidly turning up and throwing the earth over as they leave the ground, while the return or inoperative part of the stroke is nearly a horizontal line. As each crank in turn comes into operation, the fork-rods C and forks or tines C² are brought into action in succession.

Where the links L I and screwed rod or rods M are used, as shown in Fig. 1, the position of the fixed center K in relation to the frame of the machine can be varied more or less, so as to alter to some extent the path of the forks or tines C² to suit the character of the ground which is being cultivated.

The position of the crank-shaft A at the upper end of the fork-bars C not only insures the proper digging movement of the forks or tines C², but keeps the bearings and cranks away from the ground, and consequently free from dirt and wear.

Having now described my invention, what I claim as new, and desire to secure by Letters Patent, is—

1. In a mechanical digger, the combination of the fork-bars, the controlling-links pivoted to the same, and the frame and screwed bar or bars M, by which the position of the center upon which the controlling-links are pivoted can be altered and adjusted, substantially as described.

2. The pivoted fork-bars and the crank-shaft operating them, in combination with the inelastic links L I, jointed together, the frame of the machine, provided with holes l', the pins l, which connect the links L to said frame by means of any one of said holes, and pivot-pins connecting links I to the fork-bars, for the purpose set forth.

3. The fork-bars, the crank-shaft which governs them, and links which govern the path of the forks in digging, in combination with the lugs n, adjustable on the said fork-handles and provided with holes i', and the pins i, which may be shifted from one to another of said holes for altering the effective length of links I, substantially as set forth.

In testimony that I claim the foregoing I have hereunto set my hand this 27th day of September, 1886.

MARLBOROUGH ROBERT PRYOR.

Witnesses:
ARTHUR E. EDWARDS,
HERBERT RIDGWAY.